Figure 1:
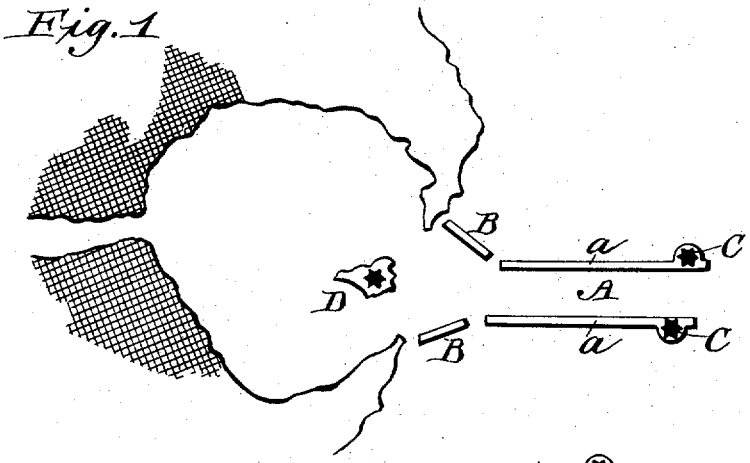

No. 11,801. Reissued Jan. 9, 1900.

A. VAN BIBBER.

HARBOR OR COAST DEFENSE.

(Application filed Nov. 2, 1899.)

Witnesses
C. Severance.
Esther Byng.

Inventor
Andrew Van Bibber
by Marion Patrick Kaumeyer
his Attorneys

THE NORRIS PETERS CO., PHOTO-LITHO., WASHINGTON, D. C.

UNITED STATES PATENT OFFICE.

ANDREW VAN BIBBER, OF CINCINNATI, OHIO.

HARBOR OR COAST DEFENSE.

SPECIFICATION forming part of Reissued Letters Patent No. 11,801, dated January 9, 1900.

Original No. 627,313, dated June 20, 1899. Application for reissue filed November 2, 1899. Serial No. 735,634.

*To all whom it may concern:*

Be it known that I, ANDREW VAN BIBBER, a citizen of the United States, residing at Cincinnati, in the county of Hamilton and State of Ohio, have invented certain new and useful Improvements in Harbor or Coast Defenses; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a system of fortification for coast cities and harbors, being designed to meet the modern method of naval attack by armored ships and guns of long range better than any system of defense hitherto in use. It is not claimed that it can be easily and cheaply adapted to all harbors irrespective of the depth of water outside; but it can be used to greatly strengthen nearly all harbors and to practically render them impregnable against naval attack, and this by the use of a comparatively small force of men and without the aid of warships. Such defense is therefore not only valuable as an insurance, but is equivalent to an increase in the navy, since it in a great measure relieves fleets from the duty of coast-defense.

The protection of harbors and coast cities should not be allowed to depend wholly on the accidental conformation of the coast-line, which may afford a much weaker defense in some cases than in others, and which in all cases can be strengthened by this system, and no place can be relied on as safe which is not practically impregnable against a powerful naval force and modern methods of attack. The greatly-increased range of naval guns demands that defensive works be more remote from the place defended than formerly or the defended city may be ruined, while the attack may be repulsed. A city affords a very large target, which partly compensates for the longer range required to reach it. Attacks may come from fleets so strong that every possible means of defense may be required to repel them. It does not do to depend on the aid of fleets which are urgently needed elsewhere and may not arrive in time.

As illustrative of the above take the harbor of New York, the entrance to which is through the "Narrows," and the main defense inside the harbor is the fort at Governors Island; but this fort is almost at right angles to the Narrows, so that said fort could not be used as a "raking" fort in direct line or parallel with the entrance and exit to the Narrows. One of the main features of my invention is to have the artificial walls, which are built out from the city, all practically horizontal on their upper surfaces and entirely or partially submerged, so as not to interfere with the range of the guns and at the same time afford an obstruction to the entrance of vessels into the harbor. In no place do we find formed by nature such a construction, for while it may be true that we may find a harbor which has a narrow inlet—as, for instance, at Santiago—we do not find that the "natural" walls, so to speak, of said inlet are submerged or partially submerged and of a practically uniform height, so as not to interfere with the range of the guns in all directions.

The invention will be hereinafter fully set forth, and its novel features will be carefully defined in the claims.

Figure 2:
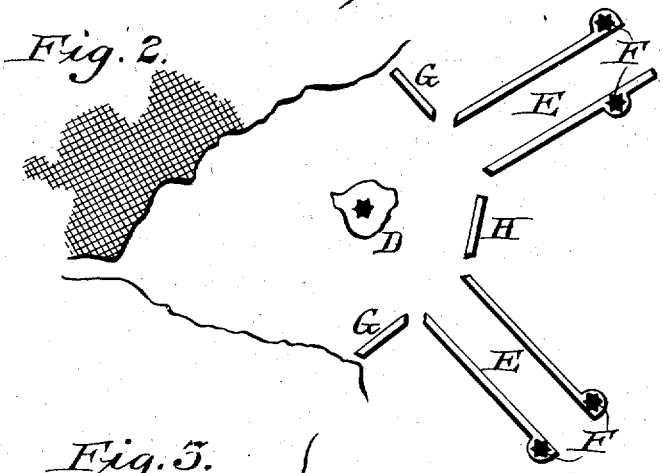
Figure 3:
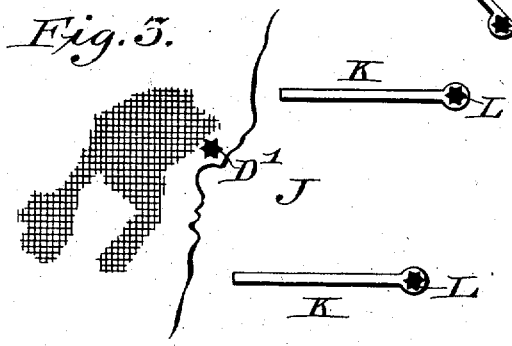

In the drawings, Figure 1 is a plan view showing in outline a harbor defended according to my system of fortification. Fig. 2 is a view similar to Fig. 1, but showing a modified arrangement of the system of fortification. Fig. 3 is a view showing the system applied for the defense of a harborless coast city.

The chief feature of my system of fortification is the artificial channel or canal A, which serves two purposes: First, if the enemy determines to enter or storm the harbor he must take that well-defended channel and can enter nowhere else. Entering by the channel A, he is exposed to the severest possible fire at known ranges and is also exposed to obstructions, mines, and other dangers of which he can know little and the locations and distances of which are accurately known to the defenders. He is also exposed to an enfilading fire from the fort or forts D, which rake and command the channel.

I preferably construct the channel A between rows or embankments *a*, of concrete blocks, and carry it out into the sea as far as possible or needful or as far as the appropriation for the purpose will permit, for it can be afterward extended. I prefer to have the tops of the embankments *a* where the tide does not rise to a very great height slightly below low-water mark and adapted to be properly buoyed and lighted when defense is not needed. I prefer, too, that the buoys and light be not removed until an attack is imminent, though it is not absolutely necessary that the buoys be removed at any time.

The channel A may be of any suitable width to allow the free entrance and departure of vessels in any weather and may be from one or two hundred yards to half a mile or over in width. The longer the channel the more effectual it will be for the purposes of defense. The main feature of the construction of the walls is to not have them interfere with the range of the guns and yet to serve as an obstruction to a vessel seeking to enter the harbor, so that it is not absolutely necessary that the tops of the walls should be entirely submerged at all times, but the entire wall sufficiently submerged as not to interfere, as stated above, with the range of the guns, though in many cases it may be preferable to have them entirely submerged, either of the arrangements falling within the spirit of my invention. The inner ends of the embankments *a* will usually be at some distance from the shore, so that the harbor can in time of peace be entered through the waters intervening between the land and said inner ends of the embankments; but in time of war it will be desirable to close or partially close up these lateral passages by means of wings B, which extend across from near the inner ends of the embankments to the shoal water at each side of the harbor-mouth. Openings may be left either between the wings B B and the embankments of the main channel A or in the embankments of the channel itself large enough for friendly vessels, properly piloted, to have free ingress or egress to the channel. The wings or auxiliary embankments B are also preferably sunken or invisible when in place, but not necessarily so, and will be removed after war, the materials for their construction being kept near at hand ready for use. They are formed of material similar to that used in the embankments *a* of the main channel or they may be formed otherwise, as by sinking loaded vessels which may be readily raised and removed.

I place upon the embankments *a* of the artificial channel the flanking-forts C C, by which I obtain a powerful fire remote from the defended city, much nearer to the enemy's ships than the latter are to the city, and I also obtain a flanking-fire along the shore, which remote and flanking fire defends the city or harbor far more effectually than would forts upon the natural shore-lines.

The flanking-forts C C and the raking fort or forts D are preferably armored and bomb-proof and are also preferably revolving with water-tight submarine chambers for magazines and other uses, though these features may be omitted, with disadvantage, for the sake of cheapness. It is plain that the embankments *a* of the channel and of the wings B do not interfere in the least with the fire of the defense, being about low-water mark, except where the tide is exceptionally high. It is not intended that these should in all cases constitute the only defenses or that any naturally strong points should be neglected, the object to be attained being the successful defense of the harbor without the aid of a fleet, and it is evident that the system may be to an extent modified to suit varying conditions. In the case of a harbor or bay with a wide mouth the arrangement shown in Fig. 2 may be adopted. As shown in this view, there are two channels E E, formed at angles to each other by embankments, the outer part of each of which is fortified, as shown at F. Wings G extend from the inner ends of the embankments to shoal water at each side of the harbor-mouth, and another wing H extends across the space between the inner ends of the respective channels, so that the entrance to the harbor can only be had through the channels E under the direct fire of the forts F. To further strengthen the defensive works, a fort I is located at the harbor-mouth in a position to command both passages or channels E, so as to subject hostile vessels passing through them to a raking-fire. This system may also be modified and employed for the defense of coast cities which are on a lien of coast without harbors. Here the same system applies; but the canal or channel J is much widened, as shown in Fig. 3, with one of the submarine embankments K flanking each end of the town and having a fort L at its outer ends. The advantage of a defense nearer to the enemy's ships remains, and the fort or battery D (shown in Figs. 1 and 2) commanding the channel may be on shore, as shown at D′. When all defensive guns are on shore in the case of a harborless city, the city is at a great disadvantage and can be ruined. By means of this system the enemy's vessels cannot maneuver freely to deliver their fire and cannot storm the harbor, for they are confined to a narrow channel and are exposed to a close destructive fire and also to obstructions and mines. While they are held at a distance from the city and harbor they are exposed to a short-range fire from guns, which may be much heavier than ships can carry and which may render their armor of no value. At the same time the forts are preferably protected by impenetrable armor heavier than can be used on ships.

To meet modern facilities and methods of attack, the system I have described is imperative and is the only safe defense. By means of this system coast cities may be intrusted with their own defense against a hostile navy and our own navy may be employed elsewhere.

Having now described my invention, what I claim as new, and desire to secure by Letters Patent, is—

1. A fortification comprising submerged embankments arranged to extend out from the harbor or city to be defended and forming between them a canal or channel, and forts located on the embankments to supply a defensive fire more remote from the city or harbor than is afforded by the shore-guns.

2. A fortification comprising embankments arranged to extend out from the harbor or city to be defended and forming between them a canal or channel, said embankments having their inner ends located away from the shore to form passages at the inner end of said canal or channel and affording access to said harbor or city, and forts located on the embankments to supply a defensive fire more remote from the city or harbor than is afforded by the shore-guns.

3. A fortification comprising embankments arranged to extend out from the harbor or city to be defended and forming between them a canal or channel, said embankments being constructed not to extend above the water a sufficient distance to interfere with the fire of the guns, and forts located on the embankments to furnish a defensive fire more remote from the city or harbor than is afforded by the shore-guns.

4. A fortification comprising embankments which extend out from a harbor or city to be defended and forming between them a canal or channel, said embankments being constructed not to extend above the water a sufficient distance to interfere with the fire of the guns, forts located on the embankments to afford a defensive fire more remote from the city or harbor than is afforded by the shore-guns, and a raking-fort located at a point in rear of the artificial channel and in line with the same.

5. A fortification comprising embankments arranged to extend out from the harbor or city to be defended and forming between them a canal or channel, said embankments having their inner ends located away from the shore to form passages at the inner end of said canal or channel and affording access to said harbor or city, and forts located on the embankments to furnish a defensive fire more remote from the city or harbor than is afforded by the shore-guns, and a raking-fort located at a point in rear of the artificial channel in line with the same, so as to afford a raking fire outwardly along the channel, substantially as described.

6. A fortification comprising embankments extending out from the harbor or city to be defended and forming between them a canal or channel, said embankments not extending above the water a sufficient distance to interfere with the range of the guns, and a fort located in rear of the artificial channel and in line therewith to afford a raking fire outwardly along the channel, substantially as described.

7. A fortification comprising embankments extending outwardly from a harbor or city to be defended and forming between them two divergent canals or channels, and a fort located at a point in rear of said channels and in line therewith so as to afford a raking fire outwardly along both channels, substantially as described.

8. A fortification comprising embankments extending outwardly from a harbor or city to be defended and forming between them two divergent canals or channels, and a fort located at a point in rear of said channels and in line therewith so as to afford a raking fire outwardly along both channels, and forts on the said embankments to furnish a defensive fire more remote from the city or harbor than is afforded by the shore-guns, substantially as described.

In testimony whereof I hereunto affix my signature in the presence of two witnesses.

ANDREW VAN BIBBER.

Witnesses:
FREDERICK HORMAN,
HOWARD DOUGLASS.